United States Patent
Zhu et al.

(10) Patent No.: US 11,999,631 B2
(45) Date of Patent: Jun. 4, 2024

(54) METHOD FOR CONTINUOUSLY PREPARING NANO ZINC OXIDE USING CARBON DIOXIDE

(71) Applicant: National Nanotechnology Star(Shanghai) Development Co., Ltd, Shanghai (CN)

(72) Inventors: Jun Zhu, Shanghai (CN); Chao Luo, Shanghai (CN); ZhiLin Huang, Shanghai (CN); XinYe Tu, Yangzhou (CN)

(73) Assignee: National Nanotechnology Star(Shanghai) Development Co., Ltd, Shanghai (CN)

( * ) Notice: Subject to any disclaimer, the term of this patent is extended or adjusted under 35 U.S.C. 154(b) by 0 days.

(21) Appl. No.: 18/489,009

(22) Filed: Oct. 18, 2023

(65) Prior Publication Data

US 2024/0067531 A1 Feb. 29, 2024

Related U.S. Application Data

(63) Continuation of application No. PCT/CN2023/114150, filed on Aug. 22, 2023.

(30) Foreign Application Priority Data

Aug. 23, 2022 (CN) .......................... 202211015052.7

(51) Int. Cl.
C01G 9/02 (2006.01)

(52) U.S. Cl.
CPC ............ *C01G 9/02* (2013.01); *C01P 2002/72* (2013.01); *C01P 2004/03* (2013.01); *C01P 2004/62* (2013.01); *C01P 2004/64* (2013.01); *C01P 2006/12* (2013.01)

(58) Field of Classification Search
CPC ...................................................... C01G 9/02
See application file for complete search history.

(56) References Cited

FOREIGN PATENT DOCUMENTS

CN 109179484 A * 1/2019

* cited by examiner

*Primary Examiner* — Shuangyi Abu Ali

(57) ABSTRACT

A method for continuously preparing nano zinc oxide using carbon dioxide. The method includes: step 1, determining experimental materials and experimental instruments; step 2, preparing a raw material and processing the raw material; step 3, oxidizing the preprocessed emulsified zinc slurry; step 4, carbonizing the zinc-free emulsified zinc slurry; step 5, filtering and washing; and step 6, drying and calcining. By using carbon dioxide as a transformation precipitant and using the carbonization method to prepare industrial by-products such as zinc slurry into alkaline zinc carbonate, the nano zinc oxide is obtained through liquid removal, impurity removal, drying, and calcination. Compared with traditional nano zinc oxide preparation methods, the method has a simple and green process flow, a wide source of raw materials, and can prepare nano zinc oxide products with different purities and particle sizes.

5 Claims, 3 Drawing Sheets

METHOD FOR CONTINUOUSLY PREPARING NANO ZINC OXIDE USING CARBON DIOXIDE

TECHNICAL FIELD

The disclosure relates to the technical field of preparing nano zinc oxide, in particular to a method for continuously preparing nano zinc oxide using carbon dioxide.

BACKGROUND

Zinc oxide is a common chemical additive, which is widely used in various industries. In particular, nano zinc oxide has become a new functional inorganic fine chemical material and plays a vital role in many application fields due to its excellent nano characteristics, such as high transparency and high dispersion.

In recent years, zinc oxide on the market has been mostly produced by direct or indirect methods, zinc oxide obtained by the direct or indirect methods has a particle size on a micrometer scale, a purity of 99.7% (commonly known as 997 zinc oxide) and a small specific surface area. The zinc oxide obtained by direct or indirect methods directly affects the performance of zinc oxide in various fields and other products containing zinc oxide. Active nano zinc oxide has significant surface and interface effects, quantum size effects, volume effects, and macroscopic quantum orbital effects due to its large specific surface area. The average particle size of the active nano zinc oxide is 20~50 nanometers (D90), and it has advantages such as high chemical activity, product fineness, chemical purity, and adjustable particle shape.

For the existing production methods of nano zinc oxide, main production methods of nano zinc oxide in the world include the ammonia-ammonium carbonate leaching method and the acid leaching method. However, the acid leaching method has a long process flow and a large amount of wastewater generated in the production process, resulting in high cost and serious environmental pollution. Although the ammonia-ammonium carbonate method has simple process and low cost, the subsequent recovery of ammonia needs to consume a lot of heat energy, and the precipitation of distilled ammonia will cause scaling and blockage of equipment.

SUMMARY

In order to solve the problems in the related art, the disclosure provides a method for continuously preparing nano zinc oxide using carbon dioxide, and the method solves the problems of long process flow, large amount of wastewater in the production process, high cost, and serious environmental pollution.

In order to achieve the above purpose, the disclosure uses the following technical solutions: a method for continuously preparing nano zinc oxide using carbon dioxide, including the following steps:

step 1, determining experimental materials and experimental instruments, wherein the experimental materials include a material containing ZnO, $Zn(OH)_2$, and Zn with ratios of 75%, 17%, and 8% respectively, carbon dioxide, hydrogen peroxide, and deionized water; and the experimental instruments include a high-pressure reactor, a high shear emulsification machine, a vacuum pump, a constant temperature oven, and a muffle furnace;

step 2, preparing a raw material (i.e., the dilute zinc slurry) and processing the raw material:

adding 2000 milliliters (mL) of the deionized water into a beaker with a capacity of 5 liters (L); weighting 800 grams (g) of the material containing ZnO, $Zn(OH)_2$, and Zn with ratios of 75%, 17%, and 8% respectively and pouring the material containing ZnO, $Zn(OH)_2$, and Zn with ratios of 75%, 17%, and 8% respectively into the beaker slowly; fully stirring the material containing ZnO, $Zn(OH)_2$, and Zn with ratios of 75%, 17%, and 8% respectively to obtain a dilute zinc slurry with a solid-liquid ratio of the material containing ZnO, $Zn(OH)_2$, and Zn with ratios of 75%, 17%, and 8% respectively to the deionized water being 1:2.5; emulsifying the dilute zinc slurry in the high shear emulsifying machine to obtain an emulsified zinc slurry; and sieving the emulsified zinc slurry to obtain a preprocessed emulsified zinc slurry;

step 3, oxidizing the preprocessed emulsified zinc slurry:

pouring the preprocessed emulsified zinc slurry into the high-pressure reactor; adding 160 mL of the hydrogen peroxide into the high-pressure reactor; and stirring the preprocessed emulsified zinc slurry at one standard atmospheric pressure for 20 minutes (min) to make zinc pure substance be transformed into zinc hydroxide, and thereby obtaining a zinc-free emulsified zinc hydroxide slurry (i.e., an emulsified zinc hydroxide slurry without zinc pure substance);

step 4, carbonizing the zinc-free emulsified zinc hydroxide slurry:

introducing $CO_2$ gas into the high-pressure reactor and maintaining a pressure in the high-pressure reactor at 0.7 megapascals (MPa) to make the zinc-free emulsified zinc hydroxide slurry and the $CO_2$ gas to perform a carbonization reaction for 110 min, then analyzing a total amount of $ZnCO_3$ generated in the carbonization reaction; ending the carbonization reaction when the total amount of $ZnCO_3$ exceeds 80%, otherwise, performing the carbonization reaction until the total amount of $ZnCO_3$ exceeds 80%; wherein during the carbonization reaction, a temperature of the carbonization reaction is maintained at 70 Celsius degrees (° C.); and a jacket of the high-pressure reactor is configured to provide cooling water to adjust the temperature when the temperature exceeds 70° C.;

step 5, filtering and washing:

stopping introducing the $CO_2$ gas after completing the carbonization reaction, releasing the pressure in the high-pressure reactor, taking out a carbonization material from the high-pressure reactor, performing vacuum filtration on the carbonization material to obtain a filter cake, washing the filter cake with the deionized water at least 3 times to obtain a washed filter cake, and reusing a washing liquid obtained after washing the filter cake to prepare the dilute zinc slurry; and step 6, drying and calcining:

drying the washed filter cake in the constant temperature oven for 4 hours to obtain dried basic zinc carbonate, wherein a mass fraction of water in the dried basic zinc carbonate is less than 1%; calcining the dried basic zinc carbonate in the muffle furnace for 120 min to obtain zinc oxide, cooling the zinc oxide to obtain cooled nano zinc oxide, crushing and sieving the cooled zinc oxide to obtain nano zinc oxide.

In an embodiment, in the step 1, a purity of the carbon dioxide is 98.5% and is contained in a steel cylinder.

In an embodiment, in the step 1, a mass fraction of the hydrogen peroxide is 27.5%.

In an embodiment, in the step 6, a temperature in the constant temperature oven is 110° C. and a temperature in the muffle furnace is 450° C.

In an embodiment, a filter liquid obtained after the vacuum filtration and the washing liquid obtained after washing the filter cake are configured to prepare the dilute zinc slurry, a waste liquid remaining from the filter liquid and the washing liquid is neutralized with soda ash to obtain a treated waste liquid with a potential of hydrogen (pH) of 7~8, and the treated waste liquid meets a national comprehensive wastewater discharge standard GB 8978-1996.

Experimental principles: in order to efficiently transform the material containing ZnO, Zn(OH)$_2$, and Zn with ratios of 75%, 17%, and 8% respectively, the experiment firstly used the hydrogen peroxide to transform zinc pure substance in the material containing ZnO, Zn(OH)$_2$, and Zn with ratios of 75%, 17%, and 8% respectively into zinc hydroxide, and then the carbon dioxide gas is introduced to carbonize the zinc hydroxide in the zinc-free emulsified zinc hydroxide slurry into the basic zinc carbonate, and the nano zinc oxide is obtained through liquid removal, impurity removal, drying and calcination. The main reaction principles are as follows:

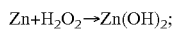
$$Zn+H_2O_2 \rightarrow Zn(OH)_2;$$

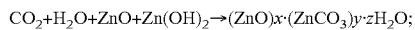
$$CO_2+H_2O+ZnO+Zn(OH)_2 \rightarrow (ZnO)x \cdot (ZnCO_3)y \cdot zH_2O;$$

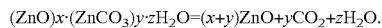
$$(ZnO)x \cdot (ZnCO_3)y \cdot zH_2O = (x+y)ZnO+yCO_2+zH_2O.$$

The method for continuously preparing nano zinc oxide using carbon dioxide provided by the disclosure has following beneficial effects.

By using carbon dioxide as a transformation precipitant and using the carbonization method to prepare industrial by-products such as the material containing ZnO, Zn(OH)$_2$, and Zn with ratios of 75%, 17%, and 8% respectively into alkaline zinc carbonate, the nano zinc oxide is obtained through liquid removal, impurity removal, drying, and calcination. Compared with traditional nano zinc oxide methods, the method of the disclosure has a simple and green process flow, a wide source of raw materials, and can prepare nano zinc oxide with different purities and particle sizes.

DETAILED DESCRIPTION OF EMBODIMENTS

The following will provide a clear and complete description of the technical solution in embodiments of the disclosure, in conjunction with the accompanying drawings. Apparently, the described embodiments are only a part of the embodiments of the disclosure, not all of them. Based on the embodiments of the disclosure, all other embodiments obtained by those of ordinary skill in the art without creative work should fall within the scope of protection of the disclosure.

Embodiment 1

Figure 1:
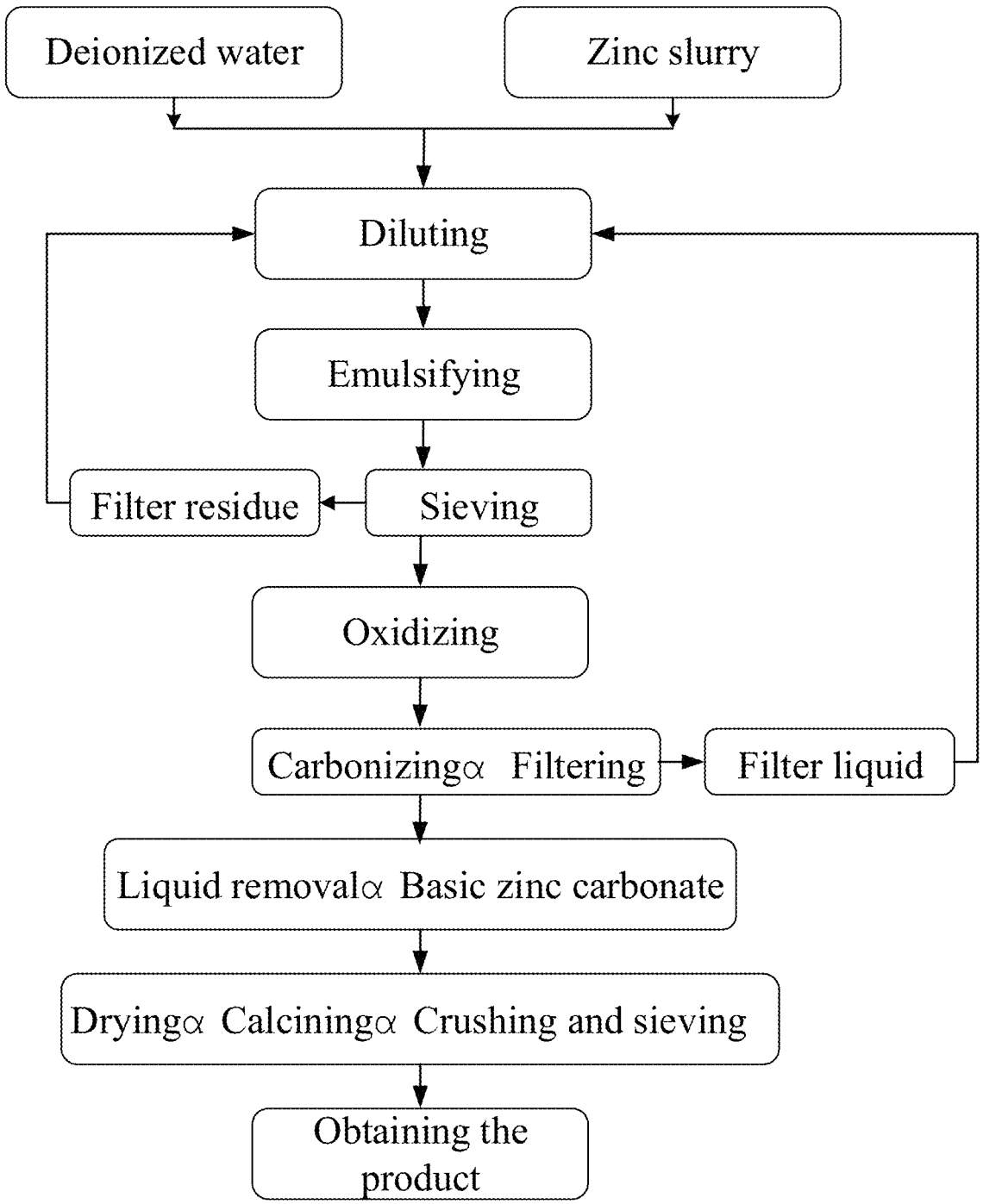
FIG. 1 illustrates a process flow diagram of the disclosure.

As shown in FIG. 1, the embodiment of the disclosure provides a method for continuously preparing nano zinc oxide using carbon dioxide. The method includes:

step 1, determining experimental materials and experimental instruments;

wherein the experimental materials include a material containing ZnO, Zn(OH)$_2$, and Zn with ratios of 75%, 17%, and 8% respectively, carbon dioxide (a purity of the carbon dioxide is 98.5%), hydrogen peroxide (a mass fraction of the hydrogen peroxide is 27.5%), and deionized water;

the experimental instruments include a high-pressure reactor (a model number of the reactor is Baikal Instrument®: LS/P-1L/YO-C), a high shear emulsification machine (a model number of the machine is united Machinery®: VME-50L), a vacuum pump, a constant temperature oven (a model number of the oven is Lichen Technology®: 101-3BS), and a muffle furnace (a model number of the furnace is Lichen Technology®: SX2-10-13);

step 2, preparing a raw material (i.e., the dilute zinc slurry) and processing the raw material:

adding 2000 mL of the deionized water into a beaker with a capacity of 5 L; weighting 800 g of the material containing ZnO, Zn(OH)$_2$, and Zn with ratios of 75%, 17%, and 8% respectively and pouring the material containing ZnO, Zn(OH)$_2$, and Zn with ratios of 75%, 17%, and 8% respectively into the beaker slowly; fully stirring the material containing ZnO, Zn(OH)$_2$, and Zn with ratios of 75%, 17%, and 8% respectively to obtain a dilute zinc slurry with a solid-liquid ratio of the material containing ZnO, Zn(OH)$_2$, and Zn with ratios of 75%, 17%, and 8% respectively to the deionized water being 1:2.5; emulsifying the dilute zinc slurry in the high shear emulsifying machine to obtain an emulsified zinc slurry; and sieving the emulsified zinc slurry to obtain a preprocessed emulsified zinc slurry;

step 3, oxidizing the preprocessed emulsified zinc slurry:

pouring the preprocessed emulsified zinc slurry into the high-pressure reactor; adding 160 mL of the hydrogen peroxide into the high-pressure reactor; and stirring the preprocessed emulsified zinc slurry at one standard atmospheric pressure for 20 min to make zinc pure substance in the preprocessed emulsified zinc slurry be transformed into zinc hydroxide, and thereby obtaining a zinc-free emulsified zinc hydroxide slurry (i.e., an emulsified zinc hydroxide slurry without zinc pure substance);

step 4, carbonizing the zinc-free emulsified zinc hydroxide slurry:

introducing CO$_2$ gas into the high-pressure reactor and maintaining a pressure in the high-pressure reactor at 0.7 MPa to make the zinc-free emulsified zinc hydroxide slurry and the CO$_2$ gas to perform a carbonization reaction for 110 min, then analyzing a total amount of ZnCO$_3$ generated in the carbonization reaction; ending the carbonization reaction when the total amount of ZnCO$_3$ exceeds 80%, otherwise, performing the carbonization reaction until the total amount of ZnCO$_3$ exceeds 80%; wherein during the carbonization reaction, a temperature of the carbonization reaction is maintained at 70° C.; and a jacket of the high-pressure reactor is configured to provide cooling water to adjust the temperature when the temperature exceeds 70° C.;

step 5, filtering and washing:

stopping introducing the $CO_2$ gas after completing the carbonization reaction, releasing the pressure in the high-pressure reactor, taking out a carbonization material from the high-pressure reactor, performing vacuum filtration on the carbonization material to obtain a filter cake, washing the filter cake with the deionized water at least 3 times to obtain a washed filter cake, and reusing a washing liquid obtained after washing the filter cake to prepare the dilute zinc slurry; and step 6, drying and calcining:

drying the washed filter cake in the constant temperature oven (a temperature in the oven is 110° C. for 4 hours to obtain dried basic zinc carbonate, and a mass fraction of water in the dried basic zinc carbonate being less than 1%; calcining the dried basic zinc carbonate in the muffle furnace (a temperature in the muffle furnace is 450° C. for 120 min to obtain zinc oxide, cooling the calcined nano zinc oxide to obtain cooled zinc oxide, crushing and sieving cooled zinc oxide to obtain nano zinc oxide.

Furthermore, a filter liquid obtained after the vacuum filtration and the washing liquid obtained after washing the filter cake are configured to prepare the dilute zinc slurry, a waste liquid remaining from the filter liquid and the washing liquid is neutralized with soda ash to obtain a treated waste liquid with a pH of 7~8, and the treated waste liquid meets a national comprehensive wastewater discharge standard GB 8978-1996.

Embodiment 2: The Influences of Solid-Liquid Mass Ratios on Carbonization Rates Five mass ratios are selected for tests, and the results are shown in the table below. When materials are too thick or too thin, the mass transfer effect and productivity will be affected.

| Sample | solid-liquid mass ratio | Pressure in the reactor/temperature | Reaction time | Carbonation rate | Particle size (D90) |
|---|---|---|---|---|---|
| 1 | 1:1 | 0.7 MPa/70° C. | 110 min | 21.25% | 1316 nm |
| 2 | 1:1.5 | 0.7 Mpa/70° C. | 110 min | 43.55% | 455 nm |
| 3 | 1:2 | 0.7 Mpa/70° C. | 110 min | 58.92% | 119 nm |
| 4 | 1:2.5 | 0.7 Mpa/70° C. | 110 min | 88.75% | 28 nm |
| 5 | 1:3 | 0.7 Mpa/70° C. | 110 min | 62.43% | 94 nm |

Based on the above tests, the results show that an optimal solid-liquid mass ratio is 1:2.5.

Embodiment 3: The Influence of Hydrogen Peroxide on Transformation Efficiency Hydrogen peroxide is selected to transform the zinc pure substance in the material containing ZnO, $Zn(OH)_2$, and Zn with ratios of 75%, 17%, and 8% respectively. Three mass ratios of the hydrogen peroxide to the zinc pure substance are selected for tests. The results are shown in the following table. When a small amount or excessive amount of hydrogen peroxide is added, the transformation will be incomplete or zinc peroxide will be generated in the reaction.

| Sample | Mass ratio (Hydrogen peroxide:Zn) | Stirring time | Pressure | Transformation situation |
|---|---|---|---|---|
| 1 | 2:1 | 20 min | One standard atmospheric pressure | Incomplete reaction |
| 2 | 2.5:1 | 20 min | One standard atmospheric pressure | Complete reaction |
| 3 | 3:1 | 20 min | One standard atmospheric pressure | Generating zinc peroxide |

Based on the above tests, an optimal mass ratio is 2.5:1.

Embodiment 4: The Influences of Pressure, Temperature, and Stirring Rate on the Carbonization Rates in Carbonization Reactions 1) The influences of different reaction pressures on the carbonization rates are tested.

Figure 2:
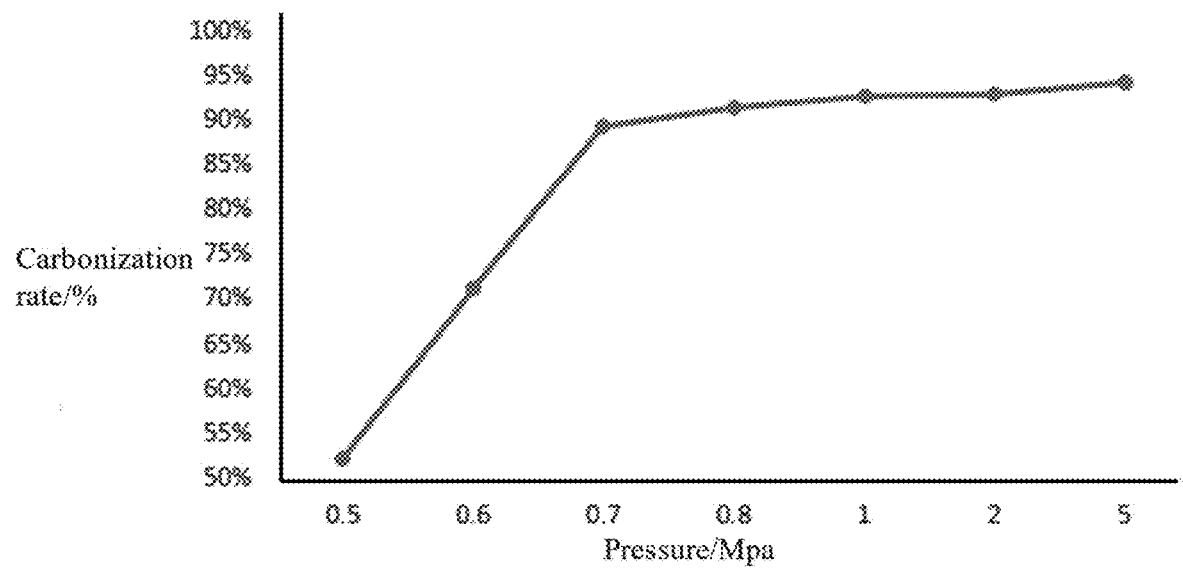
FIG. 2 illustrates a schematic diagram of carbonization rates of zinc slurry under different pressures of the disclosure.

Different pressures in a range of 0.6~5 MPa are selected to test the carbonization rates, and the results are shown in FIG. 2.

It can be seen from FIG. 2 that when the pressure is set at 0.5 MPa, the carbonation rate is low. With the pressure gradually increased, the carbonation rate increases to 89.21% when the pressure is set at 0.7 MPa. When the pressure continues to increase, the subsequent changes are not obvious, and the requirements for experimental equipment increase suddenly, and thus an operating pressure for the experiment is set at 0.7 MPa.

2) The influences of different reaction temperatures on the carbonization rates are tested.

The carbonization reaction of zinc slurry (i.e., the zinc-free emulsified zinc hydroxide slurry) belongs to a slightly exothermic reaction. Based on chemical and thermodynamic theoretical analysis, the optimal temperature range for carbonization reaction is a low temperature range. In the experiment, there is also an ionization equilibrium between electrolyte $Zn(OH)_2$ and $H_2CO_3$ in the zinc slurry. When the temperature is raised, the contents of $Zn^{2+}$ and $CO_3^{2-}$ in the zinc slurry will increase. Therefore, during the carbonization reaction of the embodiment, the temperature for the experiment is set to 70° C., and under this condition, the carbonization rate will also be greater than 80% which meets the requirement for the total amount of $ZnCO_3$.

3) The influences of different stirring rates on the carbonization rates are tested.

Figure 3:
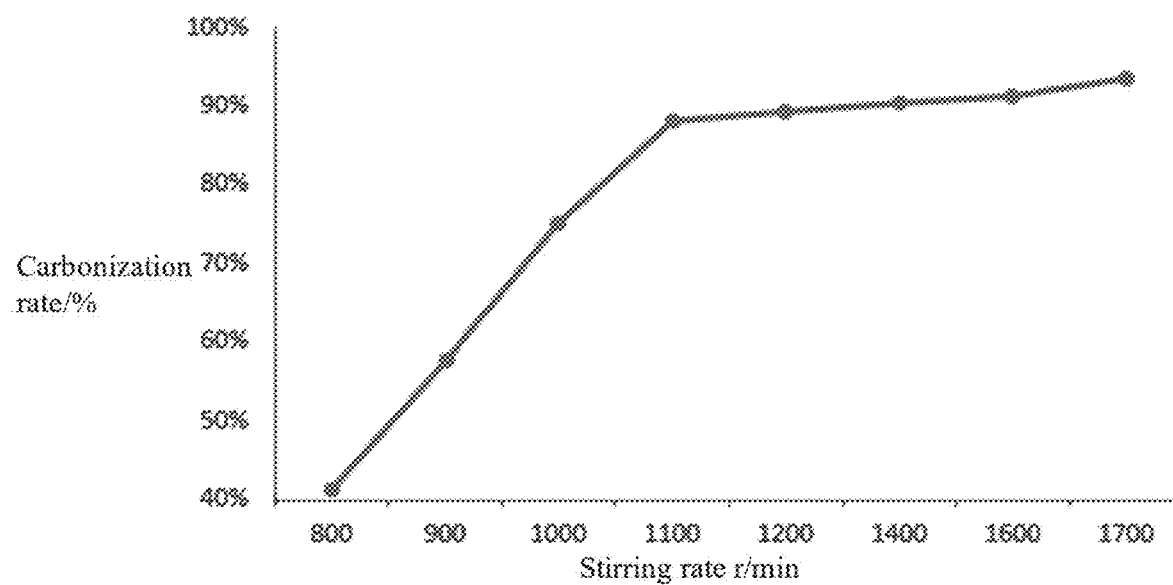
FIG. 3 is a schematic diagram of carbonization rates of zinc slurry under different stirring rates of the disclosure.

Different stirring rates in a range of 800~1700 revolutions per minute (r/min) are selected to test the carbonization rates, and the results are shown in FIG. 3.

As shown in FIG. 3, when the stirring rate is set to 800~1000 r/min, the carbonization rate of the zinc slurry is relatively low. When the stirring rate is set at 1100 r/min, the carbonization rate of the zinc slurry increases to over 85%. When the stirring rate is set at 1200~1700 r/min, the subsequent changes are not obvious, and the requirements for the test equipment suddenly increase. Therefore, the stirring rate for the experiment is set at 1100 r/min.

Embodiment 5: The Influences of Different Calcination Temperatures on the Carbonization Rates Different calcination temperatures in a range of 300~600° C. are selected to test the carbonization rates, and the results are shown in the following table.

| Calcination temperature | Calcination time | ZnO (wt %) | Appearance | Specific surface area (m²/g) | Particle size/D90 (nm) |
|---|---|---|---|---|---|
| 300° C. | 120 min | 90.13 | grayish white | 29.81 | 100~150 |
| 350° C. | 120 min | 92.55 | milky white | 30.66 | 80~120 |
| 400° C. | 120 min | 94.61 | milky white | 32.13 | 60~90 |
| 450° C. | 120 min | 95.92 | milky white | 49.89 | 20~50 |
| 500° C. | 120 min | 96.13 | beige | 38.65 | 60~90 |
| 550° C. | 120 min | 96.85 | beige | 36.74 | 60~90 |
| 600° C. | 120 min | 97.32 | dark yellow | 34.22 | 80~120 |

Based on the above tests, an optimal calcination temperature is 450° C., and the calcination time is 120 min.

Embodiment 6: Test Analysis

Figure 4:
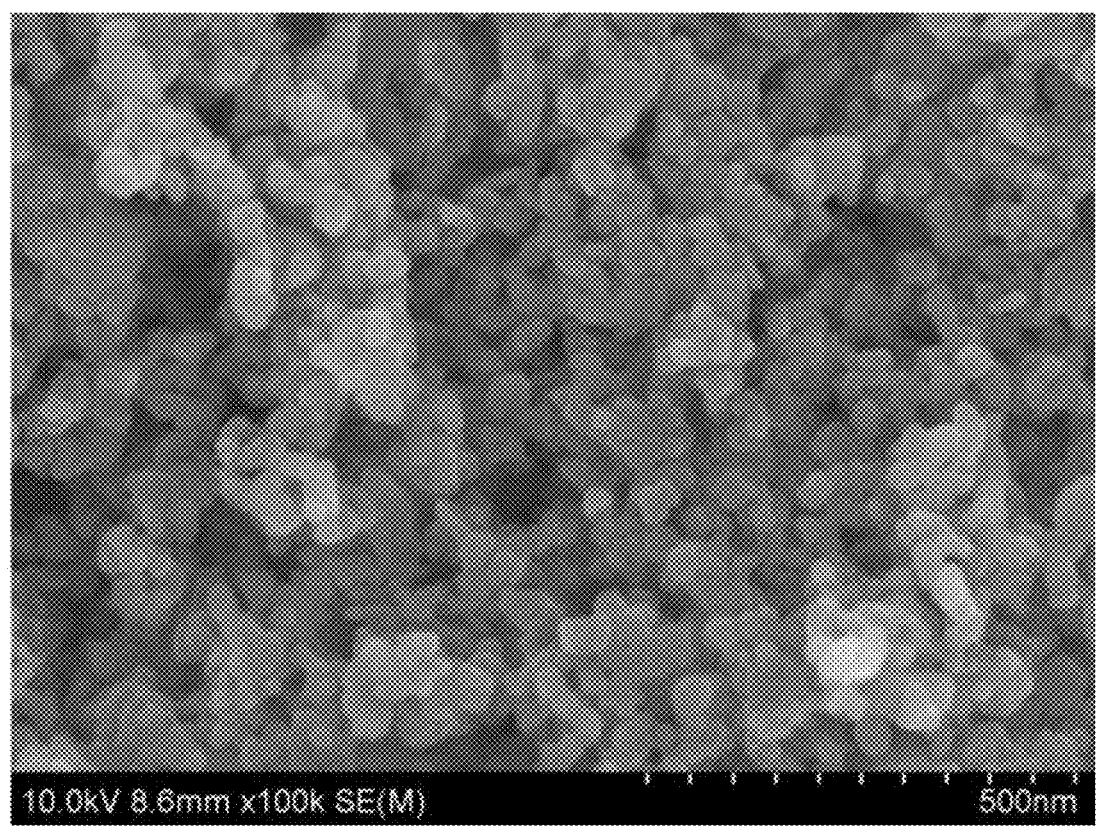
FIG. 4 illustrates a scanning electron microscope (SEM) image of the nano zinc oxide of the disclosure.
Figure 5:
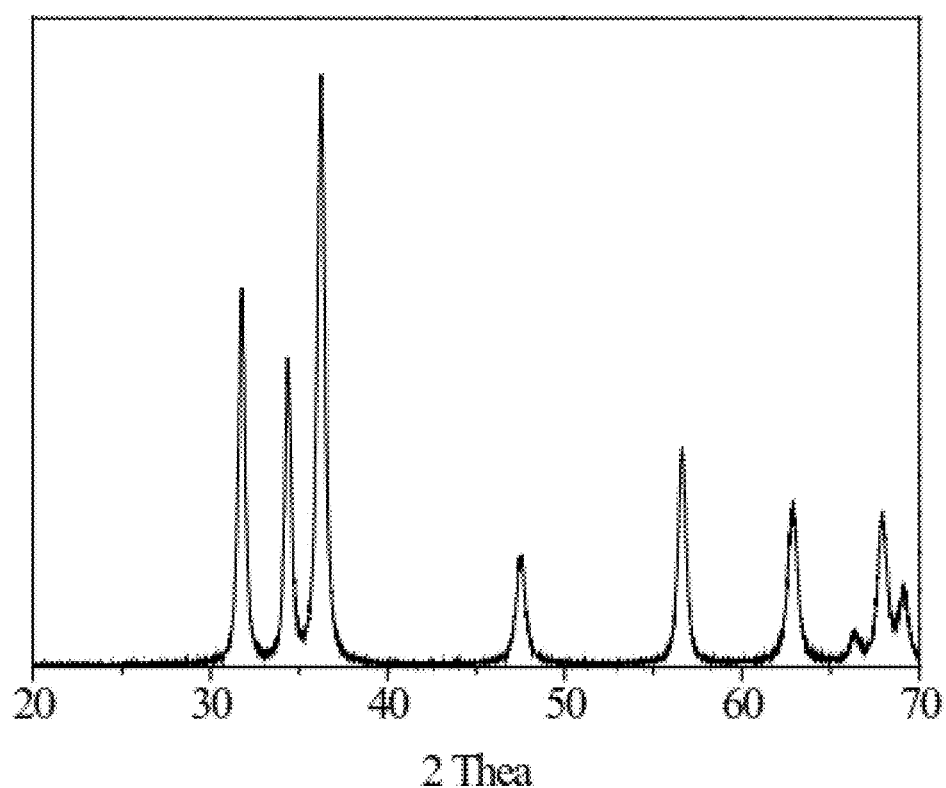
FIG. 5 illustrates a spectrogram of the nano zinc oxide detected by an X-ray diffractometer in the disclosure.

A scanning electron microscope image and an X-ray diffraction spectrogram of the final product (i.e., nano zinc oxide) obtained in the experiment are shown in FIG. 4 and FIG. 5 respectively.

From the test results in FIG. 4, it can be seen that the obtained nano zinc oxide particles have a uniform particle size distribution, and an average particle size of the nano zinc oxide is in a range of 20~40 nm. From the test results in FIG. 5, it can be seen that the obtained nano zinc oxide has a high crystallinity, and the purity of the nano zinc oxide is high by comparing the powder diffraction files (PDF) database. The average particle size of the nano zinc oxide calculated by a linewidth method is about 32 nm.

Conclusion: the experiment proves that a process path of preparing nano zinc oxide using industrial by-product (the material containing ZnO, $Zn(OH)_2$, and Zn with ratios of 75%, 17%, and 8% respectively) as a raw material and carbon dioxide as a transformation precipitant is feasible. The optimal solid-liquid mass ratio of zinc slurry in the process is set to 1:2.5 (the material containing ZnO, Zn$(OH)_2$, and Zn with ratios of 75%, 17%, and 8% respectively: deionized water), and the optimal mass ratio of transforming the zinc pure substance in the material containing ZnO, $Zn(OH)_2$, and Zn with ratios of 75%, 17%, and 8% respectively is set to 2.5:1 (hydrogen peroxide:zinc pure substance). The pressure of the high-pressure reactor is set to 0.7 MPa at a temperature of 70° C., the reaction time is 110 min, and the stirring rate is 110 r/min, and these make carbonization rate of the zinc slurry be over 85%. By setting the calcination temperature to 450° C. and the calcination time to 120 min, a nano zinc oxide product with a uniform distribution, a particle size (D90) in a range of 20~50 nm, a specific surface area of 49.89 m²/g, and a milky white appearance can be obtained. At the same time, the nano zinc oxide product with different purities and particle sizes can be prepared by adjusting the process parameters. Compared with the traditional methods, the method of the disclosure has a simple overall flow, less required equipment investment, controllable product quality by temperature, and a convenient quality control process. The method of the disclosure is a typical green chemical process, belongs to an environment-friendly process flow, and has higher economic benefits.

What is claimed is:

1. A method for preparing nano zinc oxide using carbon dioxide, comprising:
   step 1, determining experimental materials and experimental instruments, wherein the experimental materials comprise a material containing ZnO, $Zn(OH)_2$, and Zn with ratios of 75%, 17%, and 8% respectively, carbon dioxide, hydrogen peroxide, and deionized water, and the experimental instruments comprise a high-pressure reactor, a high shear emulsification machine, a vacuum pump, a constant temperature oven, and a muffle furnace;
   step 2, preparing a raw material and processing the raw material:
   adding 2000 milliliters (mL) of the deionized water into a beaker with a capacity of 5 liters (L); weighting 800 grams (g) of the material containing ZnO, $Zn(OH)_2$, and Zn with ratios of 75%, 17%, and 8% respectively and pouring the material containing ZnO, $Zn(OH)_2$, and Zn with ratios of 75%, 17%, and 8% respectively into the beaker; stirring the material containing ZnO, $Zn(OH)_2$, and Zn with ratios of 75%, 17%, and 8% respectively to obtain a dilute zinc slurry with a solid-liquid ratio of the material containing ZnO, $Zn(OH)_2$, and Zn with ratios of 75%, 17%, and 8% respectively to the deionized water being 1:2.5; emulsifying the dilute zinc slurry in the high shear emulsifying machine to obtain an emulsified zinc slurry; and sieving the emulsified zinc slurry to obtain a preprocessed emulsified zinc slurry;
   step 3, oxidizing the preprocessed emulsified zinc slurry:
   pouring the preprocessed emulsified zinc slurry into the high-pressure reactor; adding 160 mL of the hydrogen peroxide into the high-pressure reactor; and stirring the preprocessed emulsified zinc slurry at one standard atmospheric pressure for 20 minutes (min) to make zinc pure substance be transformed into zinc hydroxide, and thereby obtaining a zinc-free emulsified zinc hydroxide slurry;
   step 4, carbonizing the zinc-free emulsified zinc hydroxide slurry:
   introducing $CO_2$ gas into the high-pressure reactor and maintaining a pressure in the high-pressure reactor at 0.7 megapascals (MPa) to make the zinc-free emulsified zinc hydroxide slurry and the $CO_2$ gas to perform a carbonization reaction for 110 min, then analyzing a total amount of $ZnCO_3$ generated in the carbonization reaction; ending the carbonization reaction when the total amount of $ZnCO_3$ exceeds 80%, otherwise, performing the carbonization reaction until the total amount of $ZnCO_3$ exceeds 80%; wherein during the carbonization reaction, a temperature of the carbonization reaction is maintained at 70 Celsius degrees (° C.); and a jacket of the high-pressure reactor is configured to provide cooling water to adjust the temperature when the temperature exceeds 70° C.;
   step 5, filtering and washing:
   stopping introducing the $CO_2$ gas after completing the carbonization reaction, releasing the pressure in the high-pressure reactor, taking out a carbonization material from the high-pressure reactor, performing vacuum filtration on the carbonization material to obtain a filter cake, washing the filter cake with the deionized water at least 3 times to obtain a washed filter cake, and reusing a washing liquid obtained after washing the filter cake to prepare the dilute zinc slurry; and
   step 6, drying and calcining:
   drying the washed filter cake in the constant temperature oven for 4 hours to obtain dried basic zinc carbonate, wherein a mass fraction of water in the dried basic zinc carbonate is less than 1%; calcining the dried basic zinc carbonate in the muffle furnace for 120 min to obtain zinc oxide, cooling the zinc oxide to obtain cooled nano zinc oxide, crushing and sieving the cooled zinc oxide to obtain nano zinc oxide.

2. The method for preparing nano zinc oxide using carbon dioxide as claimed in claim 1, wherein in the step 1, a purity of the carbon dioxide is 98.5% and is contained in a steel cylinder.

3. The method for preparing nano zinc oxide using carbon dioxide as claimed in claim 1, wherein in the step 1, a mass fraction of the hydrogen peroxide is 27.5%.

4. The method for preparing nano zinc oxide using carbon dioxide as claimed in claim 1, wherein in the step 6, a temperature in the constant temperature oven is 110° C. and a temperature in the muffle furnace is 450° C.

5. The method for preparing nano zinc oxide using carbon dioxide as claimed in claim 1, wherein a filter liquid obtained after the vacuum filtration and the washing liquid obtained after washing the filter cake are configured to prepare the dilute zinc slurry, a waste liquid remaining from the filter liquid and the washing liquid is neutralized with soda ash to obtain a treated waste liquid with a potential of hydrogen (pH) of 7~8, and the treated waste liquid meets a national comprehensive wastewater discharge standard GB 8978-1996.

\* \* \* \* \*